R. R. CASE.
CLUTCH MECHANISM.
APPLICATION FILED JUNE 9, 1916.

1,236,264.

Patented Aug. 7, 1917.
3 SHEETS—SHEET 2.

Inventor
R. R. Case
By Victor J. Evans
Attorney

Witnesses

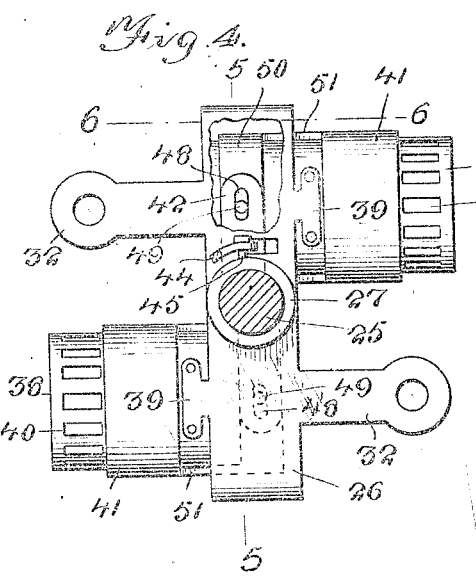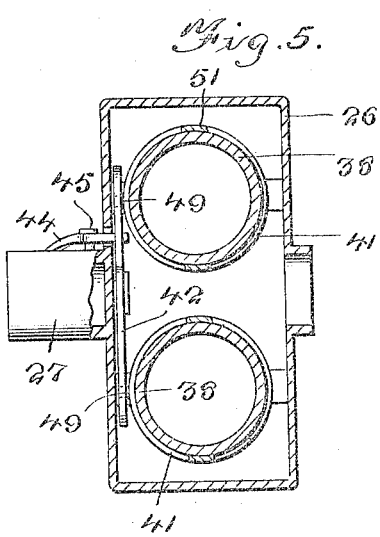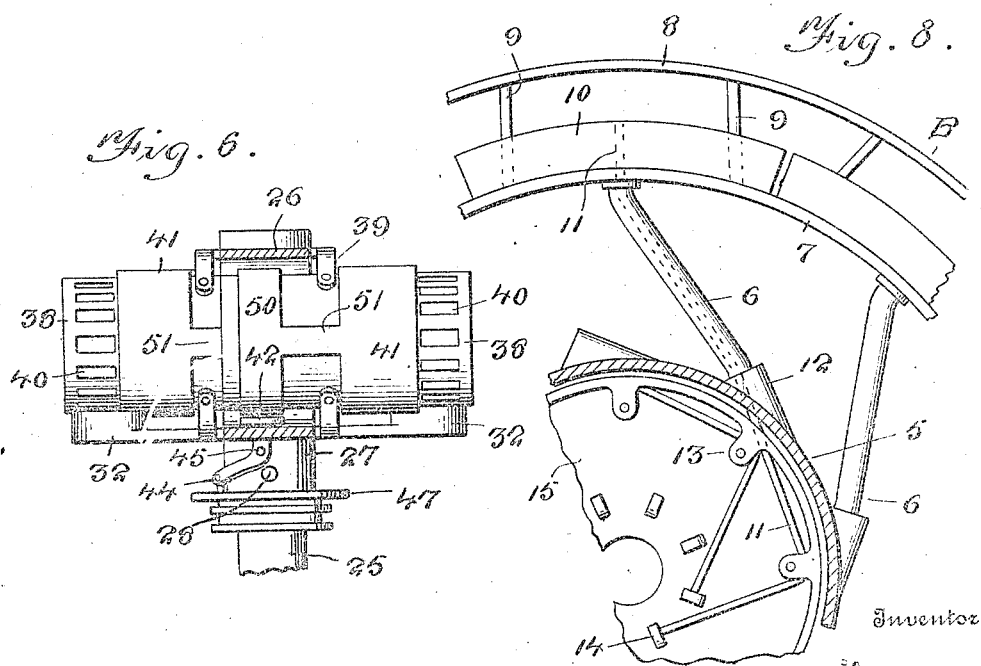

UNITED STATES PATENT OFFICE.

ROYAL R. CASE, OF RICHMOND, CALIFORNIA.

CLUTCH MECHANISM.

1,236,264.

Specification of Letters Patent.

Patented Aug. 7, 1917.

Application filed June 9, 1916. Serial No. 102,847.

*To all whom it may concern:*

Be it known that I, ROYAL R. CASE, a citizen of the United States, residing at Richmond, in the county of Contra Costa and State of California, have invented new and useful Improvements in Clutch Mechanism, of which the following is a specification.

This invention relates to clutch mechanism, the same being specially designed for use in connection with motor vehicles, whereby the driving and driven shafts of the driving mechanism may be connected and disconnected in relation to each other, said clutch mechanism being of the fluid pressure type.

A further object of the invention is to provide novel means between a member of the clutch mechanism and a fly wheel having certain novel features, whereby the requisite degree of flexibility is obtained between the clutch and fly wheel to prevent the sudden "grabbing" action of the clutch as it moves to its clutching position.

With the above and other objects in view, the invention consists in the novel construction, combination and arrangement of parts, as herein described, illustrated and claimed.

In the accompanying drawings:—

Fig. 4 is a fragmentary section on the same line as Fig. 2, on a larger scale and partly broken away.

Fig. 5 is a section on the line 5—5 of Fig. 4.

Fig. 6 is a section on the line 6—6 of Fig. 4.

Fig. 8 is a fragmentary elevation partly in section, showing the fly wheel, one member of the clutch mechanism, and the centrifugally controlled connections between the same.

Figure 1:
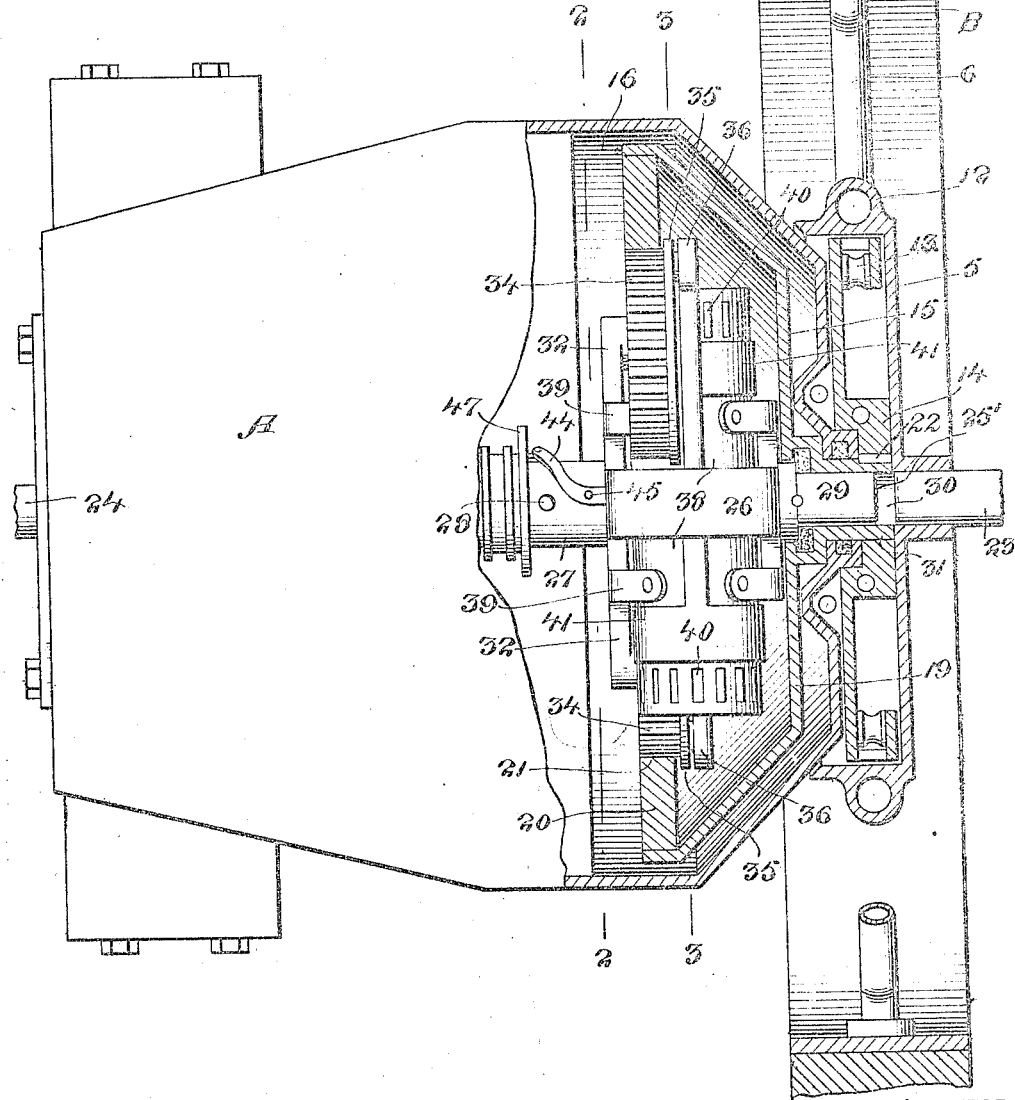
Figure 1 is a plan view partly in horizontal section of the clutching mechanism taken in line with the driving and driven shafts, showing certain parts in elevation.
Figure 2:
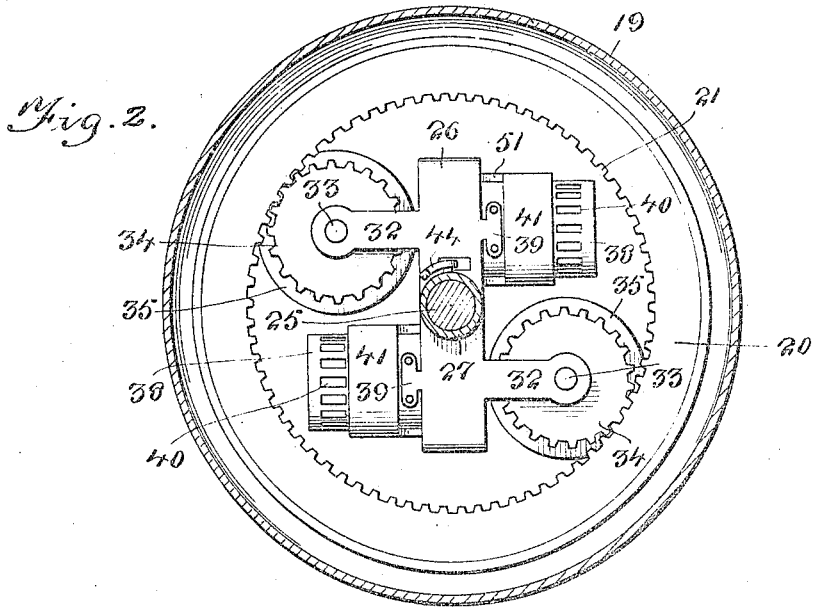
Fig. 2 is a cross section on the line 2—2 of Fig. 1.

The clutch mechanism, including the transmission mechanism (not shown) and the brake mechanism, (not shown), are inclosed within a practically liquid tight casing A designed to contain oil, soft grease, or the like in which all of the mechanism hereinafter described, with the exception of the fly wheel and parts immediately adjacent thereto and carried thereby, is partly or wholly submerged, all of the main working parts of the mechanism therefore operating in lubricating material.

B generally designates the fly wheel which as illustrated in Fig. 8 comprises a body or hub portion 5, tubular spokes 6 extending outwardly therefrom and secured thereto, and in the preferred embodiment of the invention, said fly wheel also embodies an inner fixed rim 7 and an outer fixed rim 8. These rims 7 and 8 as shown in Fig. 8 are connected by pins or rods 9 forming guides for a circular series of centrifugally operated members 10 shown in the form of arcuate blocks or weights which move in a direction radially to the center of the wheel upon the guides 9, the latter extending through guide openings in the members 10.

Connected to each of the members 10 is a flexible element 11 such as a cable. This cable passes toward the center of the wheel through one of the tubular spokes 6 and through a tubular boss 12 formed on the hub portion 5 of the fly wheel, thence around one of a series of pulleys 13, the inner end of the flexible connection 11 being shown as secured fixedly to a stationary lug 14 on one face of an oscillatory clutch take-up member 15. It will now be understood that when a load is placed upon the member 15 or in other words when resistance is offered to the rotation of the member 15, the flexible connections 11 are operated upon by the pulleys 13 to draw the weighted sections or members 10 inwardly while the fly wheel is rapidly revolved. When no resistance is applied to the member 15, while the fly wheel is revolving, the members 10 are held outwardly against the limiting or stop rim 8 by centrifugal action.

The clutch mechanism contained within the compartment 16 which is partly cylindrical and partly conical, comprises a main clutch gear embodying a hollow or dished body 19, and an inwardly extending rim or flange 20 having internal gear teeth 21 as shown in Fig. 1. The main clutch gear 19 is shown as connected to the member 15 by means of a key 22 or the equivalent thereof. Therefore, the members 15 and 19 have a fixed relation to each other so as to rotate in unison.

The fly wheel is mounted fast on one end of the driving shaft 23 which in automobile practice will constitute the engine shaft. 24 represents the driven shaft which in automobile practice extends rearwardly to the differential gearing. Between the shafts 23 and 24 is an intermediate shaft 25 which has no direct connection with the shaft 23, but is directly driven when the clutch is operated, being adapted to be connected thereto and disconnected therefrom by means of the clutch mechanism. The shaft 25 is therefore the one which is directly driven from the driving shaft 23 by means of the clutch mechanism. 26 represents a clutch head or carrying member for certain elements of the clutch mechanism as illustrated, for example, in Figs. 2, 3, 4, and 6. This head 26 is mounted on a sleeve 27 surrounding the intermediate shaft 25 and is fixed in relation to the shaft 25 by means of a pin or key 28 or the equivalent thereof. Connected to the opposite end of the head 26 is a journal or shaft extension 29 which is supported within the central bore 30 of the extended hub portion 31 of the main clutch gear 19 as shown in Fig. 1.

Figure 3:
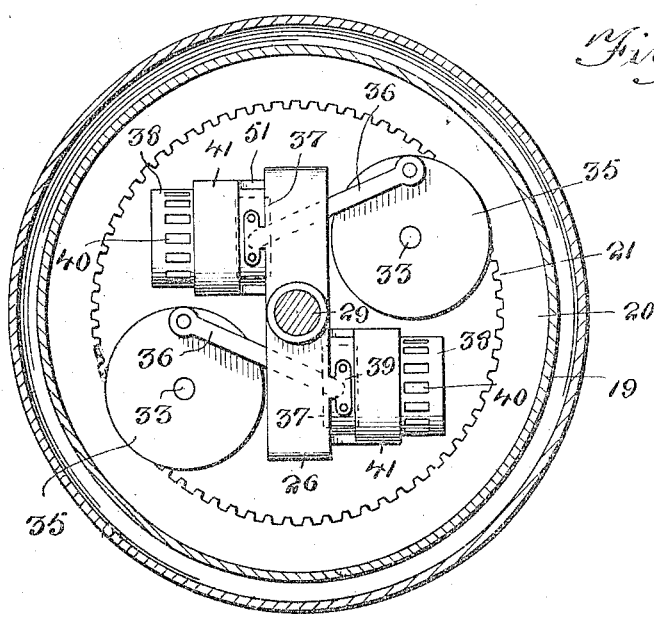
Fig. 3 is a section on the line 3—3 of Fig. 1.
Figure 7:
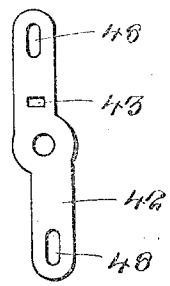
Fig. 7 is a detail plan view of the yoke lever.

The head 26, in the preferred embodiment of this invention, is provided with oppositely projecting arms 32 supporting the journals or shafts 33 of a pair of pinions 34 which are in constant mesh with the teeth 21 of the main clutch gear 19. This is most clearly illustrated in Fig. 2. As shown in Fig. 3, the pinions 34 carry in fixed relation thereto crank disks 35 from which connecting rods 36 extend to pistons 37 reciprocating in cylinders 38 which are supported by extensions 39 of the head 26.

Each of the cylinders 38 is shown as formed with a plurality of ports 40 for the inlet and outlet of the lubricating material contained within the casing A. Surrounding each of said cylinders is a ring like or hollow cylindrical sleeve valve 41 which is slidable longitudinally of the cylinder so as to partly or wholly open and close or cover and uncover the ports 40. The valves 41 are connected together by means of a lever 42 which is mounted about centrally of its length within the head 26 as shown in Fig. 5. One arm of the lever 42 is formed with a socket or hole 43 to receive one arm of a shifting lever 44, the latter being pivotally mounted at 45 on a hub sleeve 27 of the head 26. The longer arm of said lever 44 is connected as shown in Figs. 1 and 6 to a collar 47 slidable longitudinally of and upon the sleeve 27, said sleeve being formed to be engaged and operated by a shifting fork (not shown) usually operated by a foot pedal as in the ordinary automobile practice for throwing the clutch out or in. The two arms of the lever 42 are formed with longitudinal slots 48 to engage pins 49 on circular extensions 50 of the valves 41, the parts 41 and 50 being shown in Fig. 6 as connected by the webs or bars 51.

It will now be understood that when the clutch is thrown out, the intermediate shaft 25 is not actuated for the reason that it is temporarily disconnected from the driving shaft 23. Under such arrangement, the main clutch gear 19 being fastened to the fly wheel is constantly driven thereby and therefore serves to revolve the pinions 34, the journals 33 of which and the head 26 are at rest. Under such arrangement, the valves 41 are in the position illustrated in Figs. 2 and 3. To operate the clutch, the valves 41 are moved gradually outward so as to cover the ports 40 of the cylinders 38. This forms a resistance to the working of the pistons 37 and serves to prevent the pinions 34 from turning. When the ports 40 are fully covered, there can be no further movement of the pistons 37 and therefore the pinions 34 are practically locked in relation to the main clutch gear 19. On account of the latter being fastened to the take-up member 15, the flexible connections 11 are pulled inwardly thus drawing the weighted members 10 inwardly, which have been previously held out by centrifugal action. Thus the clutch is rendered effective for connecting the shafts 23 and 25 without the objectionable grabbing action incident to the use of many of the present day clutches used in a similar connection. The flexible connection between the clutch and the fly wheel centrifugal members and the gradual closing of the ports 40 by means of the valves 41 coöperate to produce the end referred to, viz., the operation of the clutch free from any tendency to grab. This adds greatly to the comfort of the passengers and the life and durability of all parts of the car and the mechanism thereof.

From the foregoing description, taken in connection with the accompanying drawings, it will now be understood that the clutch may be operated gradually and that automatic means are provided for taking up the gripping movement of the clutch so as to prevent the objectionable grabbing action thereof noticeable in many cars. The gradual gripping movement of the clutch is brought about through two agencies one consisting in the flexible connection between the main clutch gear and the fly wheel, and the other being brought about by the operation of the sleeve valves which may be shifted gradually into position to partly or wholly cover the ports in the cylinders of the clutch mechanism. See Fig. 6. The shaft 25 is provided at the extremity thereof with an end thrust ball bearing 25'.

I claim:—

1. The combination of a driving shaft, a driven shaft, a fly wheel fast on the driving shaft, a clutch for connecting and disconnecting the driving and driven shafts including flexible means between said clutch and fly wheel operating to prevent the clutch from grabbing, and centrifugally controlled means tensioning said flexible means.

2. The combination of a driving shaft, a driven shaft, a fly wheel fast on the driving shaft, a clutch for connecting and disconnecting the driving and driven shafts, a centrifugally controlled member carried by said fly wheel, and a flexible connection between said member and a member of the clutch.

3. The combination of a driving shaft, a driven shaft, a fly wheel fast on the driving shaft, a clutch for connecting and disconnecting the driving and driven shafts, said clutch embodying a main internally toothed clutch gear driven by the fly wheel, a clutch head fast on the driven shaft, a pump carried by the latter and comprising a piston and a cylinder having a port therein, a pinion journaled on said head in mesh with the clutch gear and operatively coupled to said piston by a connecting rod, and a manually controlled sleeve valve for opening and closing the port in said cylinder.

4. The combination of a driving shaft, a driven shaft, a fly wheel fast on the driving shaft, a clutch for connecting and disconnecting the driving and driven shafts, said clutch embodying a main internally toothed clutch gear driven by the fly wheel, a clutch head fast on the driven shaft, a plurality of pumps carried by the latter and each comprising a piston and a cylinder having a port therein, a plurality of pinions journaled on said head in mesh with the clutch gear and operatively coupled to said pistons by connecting rods, and simultaneously operable manually controlled sleeve valves for opening and closing the ports in said cylinders.

5. The combination of a driving shaft, a driven shaft, a fly wheel fast on the driving shaft, and a clutch mechanism for connecting and disconnecting the driving and driven shafts, said clutch mechanism comprising a gear mounted on the driven shaft, a pump including a piston and cylinder the latter having a port therein, a connecting rod gear meshing with and actuated by said gear on the driven shaft, a connecting rod between the piston and connecting rod gear, and a manually operable sleeve valve surrounding said cylinder and controlling the port therein.

In testimony whereof I affix my signature.

ROYAL R. CASE.

Witnesses:
C. S. HANNUM,
MYRTLE SCHERRUBLE.